United States Patent
Hikari

(10) Patent No.: US 6,598,715 B2
(45) Date of Patent: Jul. 29, 2003

(54) CLAMP DEVICE

(75) Inventor: Kazuo Hikari, Suita (JP)

(73) Assignee: Sanyo Kogyo Co., Ltd., Osaka (JP)

( * ) Notice: Subject to any disclaimer, the term of this patent is extended or adjusted under 35 U.S.C. 154(b) by 0 days.

(21) Appl. No.: 09/878,386

(22) Filed: Jun. 12, 2001

(65) Prior Publication Data
US 2002/0125080 A1 Sep. 12, 2002

(30) Foreign Application Priority Data
Mar. 12, 2001 (JP) ........................... 2001-068207

(51) Int. Cl.[7] ............... F16D 65/38; D60L 3/00
(52) U.S. Cl. ................... 188/73.38; 188/24.22
(58) Field of Search ............ 188/24.11–24.22, 188/73.38, 73.1

(56) References Cited

U.S. PATENT DOCUMENTS

| | | | | |
|---|---|---|---|---|
| 3,403,756 A | * | 10/1968 | Thirion | 188/73.43 |
| 3,710,896 A | * | 1/1973 | Machek | 188/73.36 |
| 3,756,353 A | * | 9/1973 | Bombassei et al. | 188/73.39 |
| 3,986,164 A | * | 10/1976 | Hirai et al. | 188/1.11 L |
| 4,394,891 A | * | 7/1983 | Oshima | 188/73.38 |
| 4,408,681 A | * | 10/1983 | Oshima | 188/73.38 |
| 4,410,069 A | * | 10/1983 | Schreiner et al. | 188/73.36 |
| 4,422,534 A | * | 12/1983 | Oshima | 188/73.38 |
| 4,491,204 A | * | 1/1985 | Dirauf et al. | 188/73.38 |
| 4,515,249 A | * | 5/1985 | Escarabajal et al. | 188/73.38 |
| 4,516,666 A | * | 5/1985 | Sheill | 188/73.38 |
| 4,540,068 A | * | 9/1985 | Ritsema | 188/73.39 |
| 5,069,313 A | * | 12/1991 | Kato et al. | 188/72.3 |
| 5,249,647 A | * | 10/1993 | Kobayashi et al. | 188/72.3 |
| 5,310,024 A | * | 5/1994 | Takagi | 188/72.3 |
| 5,511,638 A | * | 4/1996 | Tsuruta | 188/72.3 |
| 5,538,103 A | * | 7/1996 | Rueckert et al. | 188/72.3 |
| 5,950,772 A | * | 9/1999 | Buckley et al. | 188/26 |

* cited by examiner

Primary Examiner—Jack Lavinder
Assistant Examiner—Robert A. Siconolfi
(74) Attorney, Agent, or Firm—Armstrong, Westerman & Hattori, LLP

(57) ABSTRACT

A clamp device having a body made of a pair of half bodies connected and unified with a fixation member. One of friction plate units is elastically pushed by a first spring in a direction parting from a disc and in a rotating direction of the disc simultaneously, and the other of the friction plate units is elastically pushed by a second spring in a direction parting from the disc and in a reverse direction of the rotating direction simultaneously.

4 Claims, 7 Drawing Sheets

CLAMP DEVICE

BACKGROUND OF THE INVENTION

1. Field of the Invention

This invention relates to a clamp device.

2. Description of the Related Art

In a conventional clamp device, each of back face plates of two frictional members, disposed as to clamp a disc, is provided with an elastic notched portion, each of protruding portions of press members is hitched to the notched portion to part the frictional members from the disc when the press members retreat, and one of the two frictional members on the both sides of the disc is pushed in a rotation direction of the disc by an elastic member and the other of the two frictional members is pushed in an opposite direction to the rotation direction by another elastic member.

The conventional clamp device as described above is expensive for many parts and a complicated construction because means for retreating the frictional member is disposed respectively on the press members and one elastic member is disposed respectively on each of the push member in different directions.

To solve the conventional problems above, it is therefore an object of the present invention to provide an inexpensive clamp device having a simple construction and very small number of parts.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
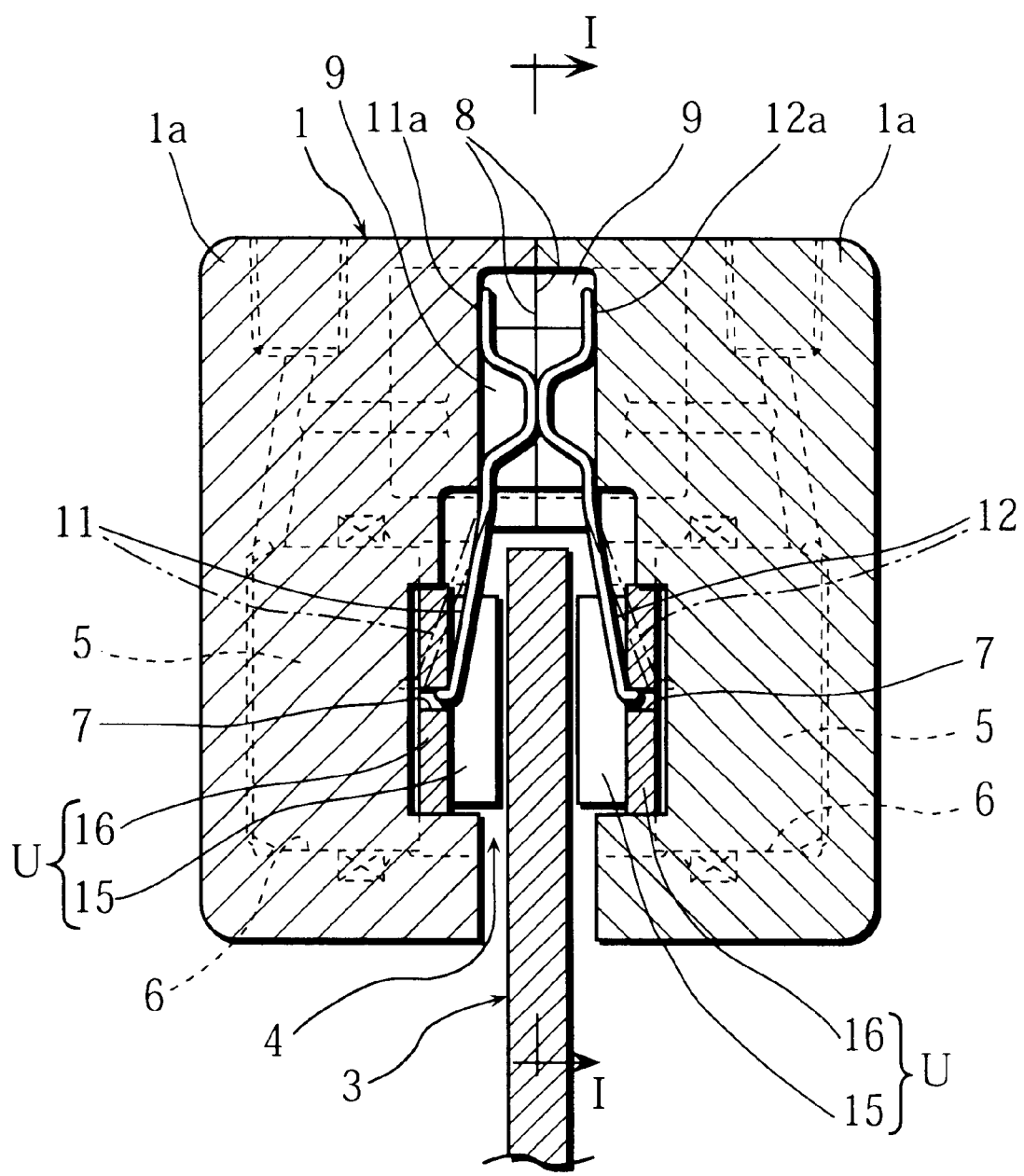
FIG. 1 is a partial cross-sectional side view showing an embodiment of the present invention.
Figure 2:
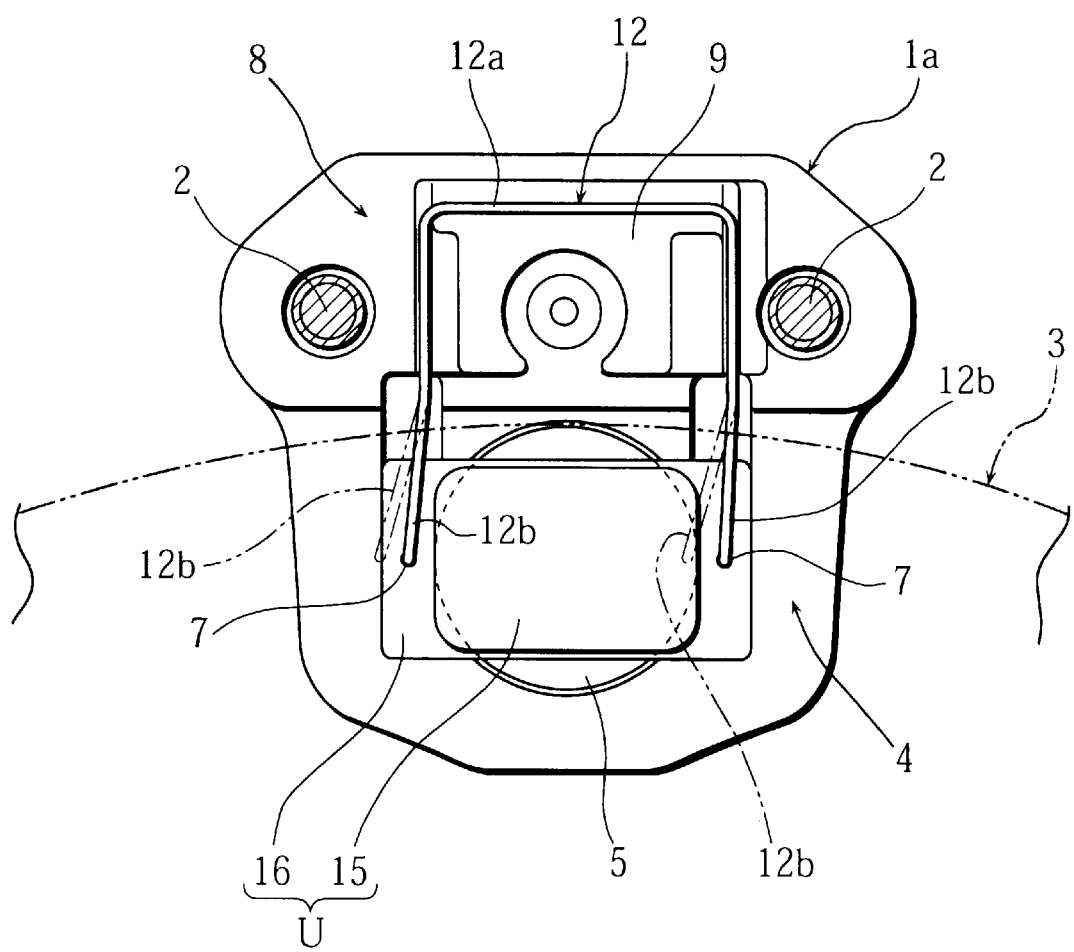
FIG. 2 is a cross-section at an I—I line observed in arrows direction of FIG. 1.

In a cross-sectional view of FIG. 1 and FIG. 2 showing a cross-section at an I—I line observed in arrows' direction, mark 1 represents a body that one pair of half bodies 1a are connected and unified with fixation members (fastening members) 2 such as bolts, mark 3 represents a disc as a clamped member (braked member), and a concave portion 4, to which a periphery of the disc 3 is inserted, is formed in the body 1.

To the disc 3 inserted to the concave portion 4 (from a lower side in FIGS. 1 and 2), friction plate units U for pressing the both sides of the disc 3 and fluid pressure pistons 5 for pressing the units U on their backs are provided. That is to say, each of the half bodies 1a of the body 1 is provided with a round hole having a bottom to form a cylinder chamber 6, the piston 5 is inserted to the cylinder chamber 6 as to be movable. When oil-hydraulic pressure or air pressure works on the piston 5, the piston 5 is moved forward to the concave portion 4 side for pressing the friction plate unit U onto the both sides of the periphery of the disc 3 to fix (clamp) the rotation of the disc 3.

The friction plate unit U is composed of an approximately rectangular frictional material 15 which directly contacts the side of the disc 3 and a backing plate 16 (approximately rectangular) fixed to a back face of the frictional material 15 for reinforcement. The backing plate 16 is formed into a dimension slightly larger than that of the frictional material 15. Specifically, width dimension of the backing plate 16 is rather large as shown in FIG. 2, and a hitching small hole 7 going through the backing plate 16 is formed each of middle portions of a left side and a right side.

Figure 3B:
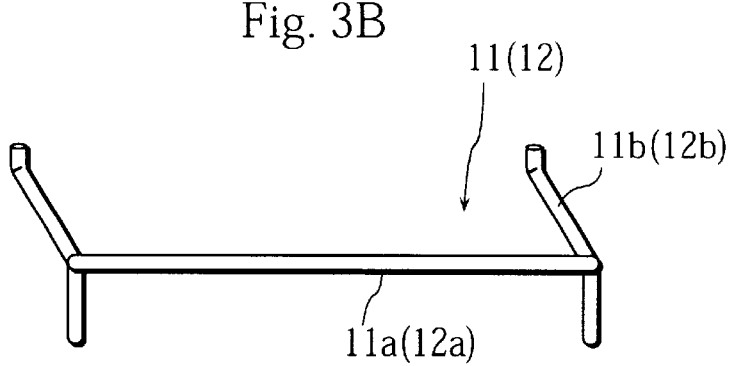
FIG. 3B is an explanatory view of an example of a configuration of the first spring (second spring)
Figure 3A:
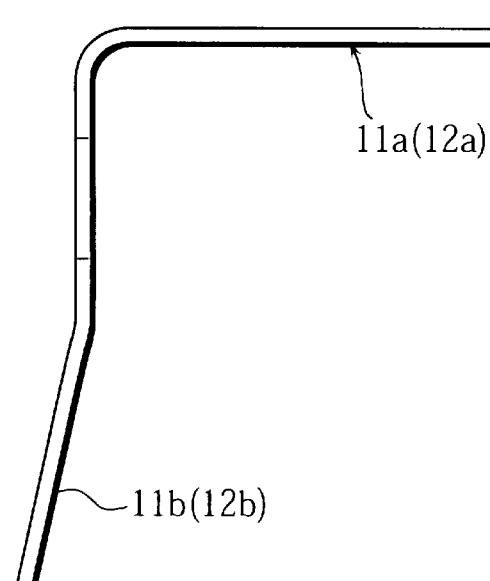
FIG. 3A is an explanatory view of an example of a configuration of a first spring (second spring)
Figure 3C:
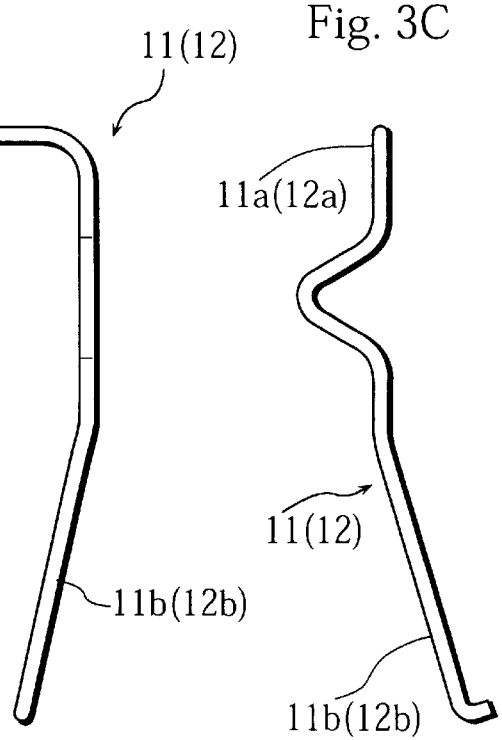
FIG. 3C is an explanatory view of an example of a configuration of the first spring (second spring)

And, 11 is a first spring and 12 is a second spring each of which is formed into an approximately gate-shaped configuration as shown in FIG. 3 with a bent wire. FIG. 3A is a front view, FIG. 3B is a top view, and FIG. 3C is a side view. In the body 1, concave grooves 9 are formed on a mating face 8 of the half bodies 1a of the body 1, an upper side ha of the first spring 11 and an upper side 12a of the second spring 12 are put into the concave grooves 9 to hold (punch) the first spring 11 and the second spring 12 with connection and unification of the half bodies 1a by the fixation members 2.

And, both of forth ends of leg portions 11b of the first spring 11 are hitched to the hitching small holes 7 on the backing plate 16 of one of the friction plate units U (on the left side in FIG. 1). On the other hand, both of forth ends of leg portions 12b of the second spring 12 are hitched to the hitching small holes 7 on the backing plate 16 of the other of the friction plate units U (on the right side in FIG. 1).

In free state of FIG. 3 and free state shown in FIG. 1 (and FIG. 2) with two-dot broken lines, the first spring 11, formed into a predeformed configuration as to always pushes one of the pair of the friction plate units U elastically in a direction to part from the disc 3 and assembled as a continuous line in FIG. 1 (and FIG. 2), shows two functions, namely, recovering function of the piston 5 and sheer-preventive function of the friction plate unit U in rotation direction simultaneously.

On the other hand, the second spring 12 in the free state of FIG. 3 and shown in FIG. 1 and FIG. 2 with two-dot broken lines is assembled with elastic deformation as shown with continuous lines in FIG. 1 and FIG. 2 as to always pushes elastically the other of the friction plate units U in the direction to part from the disc 3 and an opposite direction to the rotation of the disc 3 simultaneously. With this construction, the second spring 12 has (shows) the two functions above simultaneously.

Although it is clearly shown by the above description, to add further explanation for accuracy, the first spring 11 and the second spring 12 have an identical configuration shown in FIG. 3. (That is to say, the first spring 11 and the second spring 12 do not have to be made symmetric each other.)

Figure 4:
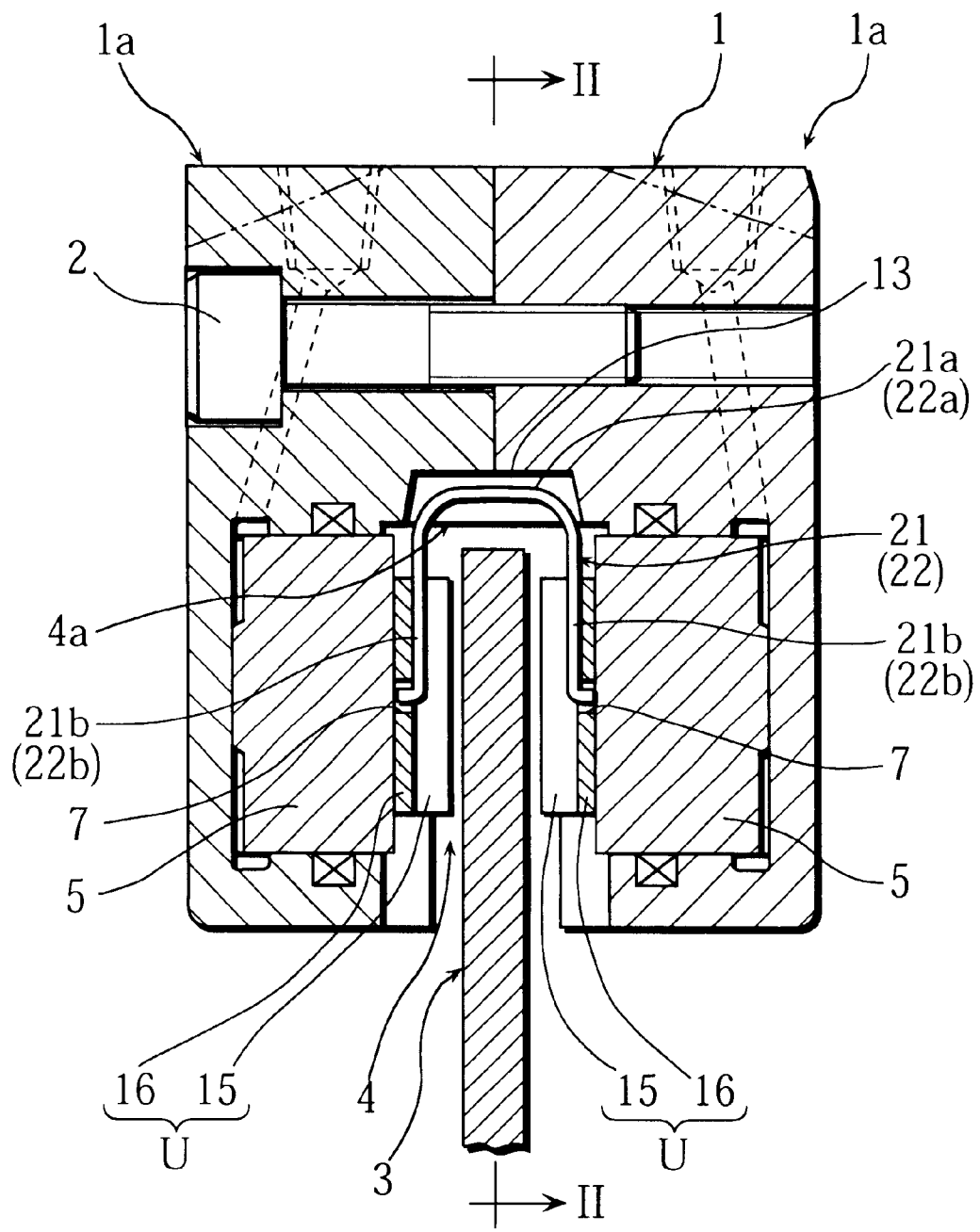
FIG. 4 is a cross-sectional side view of another embodiment.
Figure 5:
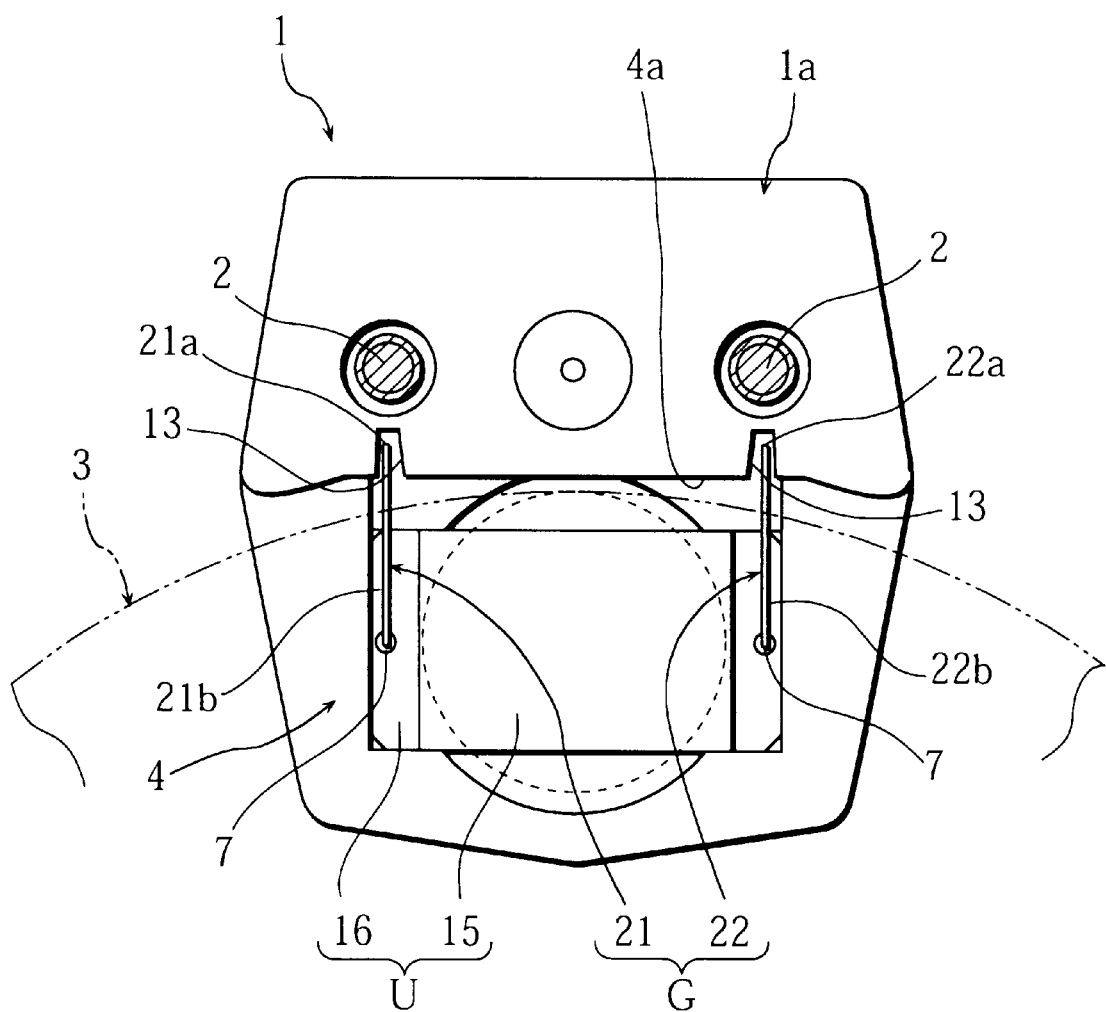
FIG. 5 is a cross-section at a II—II line observed in arrows' direction of FIG. 4.
Figure 6:
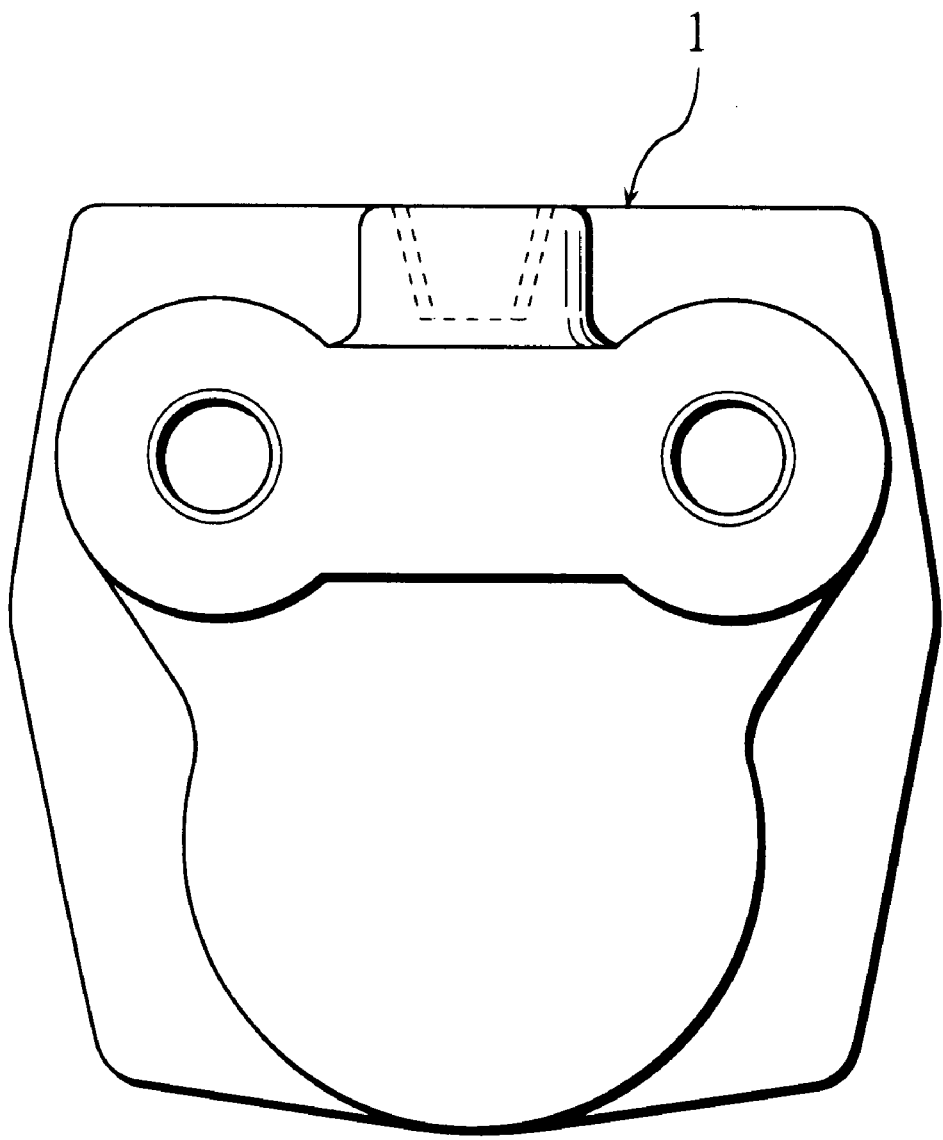
FIG. 6 is a front view.

Next, FIGS. 4 through 7 show another embodiment. FIG. 4 is a cross-sectional view, FIG. 5 is a cross-section at a II—II line observed in arrows' direction in FIG. 4, FIG. 6 is a front view of an external feature of the clamp device, and FIG. 7 is an explanatory view of a principal portion.

In these FIGS. 4 through 7, the clamp device constructed similar to the embodiment above has a body 1 in which one pair of half bodies 1a are connected and unified with fixation members (fastening members) 2, and a concave portion 4, to which a periphery of a disc 3 is inserted, is formed in the body 1. And, the following points are also similar to the above embodiment. The friction plate unit U is composed of the frictional material 15 and the backing plate 16. The piston 5 is inserted to a round hole having a bottom on each of the half bodies 1a of the body 1 as to be movable, and the piston 5 pushes the disc 3 with oil-hydraulic pressure or air pressure, etc.

The backing plate 16 is formed slightly larger than that of the frictional material 15 at least in horizontal direction in FIG. 4, and a hitching small hole 7 going through the backing plate 16 is formed each of middle portions of a left side and a right side.

And, an elastic member G, which elastically pushes the friction plate units U in directions parting each other and in a rotation direction of the disc 3 and an opposite direction to the rotation direction simultaneously, is provided.

Concretely, the elastic member G is composed of an approximately gate-shaped (or, U-shaped) first spring 21 and an approximately gate-shaped (or, U-shaped) second spring 22. A pair of slitlike concave grooves 13 are formed on a corresponding face 4a corresponding to the periphery of the disc 3 in the concave portion 4 to which the periphery of the disc 3 is inserted. As shown in FIG. 5, the concave grooves 13 are formed parallel to correspond to positions above left and right sides of the rectangular backing plate 16, each of an upper side 21a of the first spring 21 and an upper side 22a of the second spring 22 is inserted to the concave groove 13, left and right leg portions 21b are hitched to the pair of friction plate units U facing each other, and left and right leg portions 22b of the second spring 22 are hitched to the pair of friction plate units U facing each other.

To describe further in detail, as shown in FIG. 4, each of the first spring 21 and the second spring 22 is disposed as to stride the periphery of the disc 3, and a plane of the disc 3 is at right angles with a plane of the first spring 21 and a plane of the second spring 22. Each of lower ends (forth ends) of the leg portions 21b of the first spring 21 and lower ends (forth ends) of the leg portions 22b of the second spring 22 is bent to form small protruding portions 21c and 22c. And, the small protruding portions 21c and 22c are hitched to the hitching small holes 7 to assemble the parts.

Figure 7A:
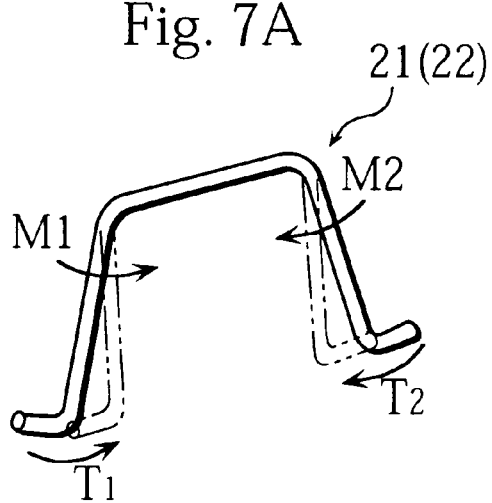
FIG. 7A is an explanatory view of a configuration and working of the first spring (second spring)
Figure 7B:
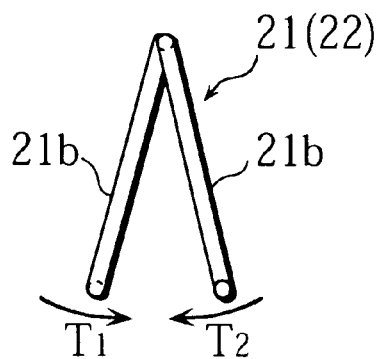
FIG. 7B is an explanatory view of the configuration and working of the first spring (second spring)
Figure 7C:
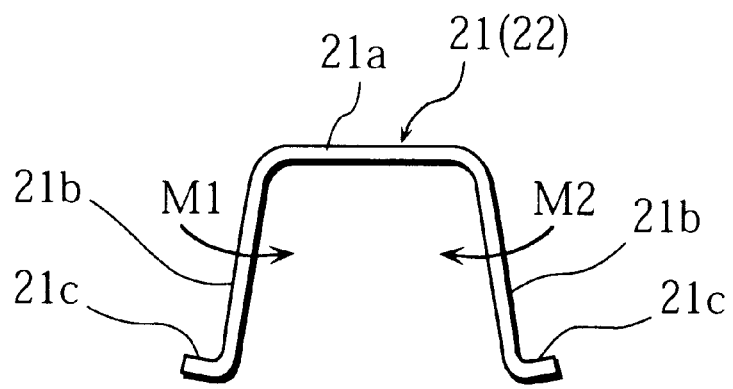
FIG. 7C is an explanatory view of the configuration and working of the first spring (second spring).

In FIG. 7, showing the first spring 21 and the second spring 22, FIG. 7A is a perspective view, FIG. 7B is a side view, and FIG. 7C is a front view. Continuous lines show a free state and two-dot broken lines (imaginary lines) show an assembled state.

As clearly shown in FIGS. 7A, 7B, and 7C, in the first spring 21 and the second spring 22 composed of wires formed into a gate-shaped configuration, the left and right leg portions 21b(22b) are open in the free state, and the friction plate units U are elastically pushed continuously in opposite directions by assembly with moment $M_1$ and $M_2$.

And, as shown in FIGS. 7A and 7B, the leg portions 21b (22b) are twisted at the upper side 21a (22a) as to open downward, and the friction plate units U are elastically pushed continuously in the rotation direction of the disc 3 and in the opposite direction respectively.

Although the springs 11, 12, 21, and 22 made of wire are shown in FIGS. 1 through 7, they may be plate springs of sheet metal. And, the four leg portions 11b and 12b or the four leg portions 21b and 22b may be made as a united (unified) construction.

According to the clamp device of the present invention, the first spring 11 and the second spring 12 are very easily assembled and certainly fixed because the body 1 is composed of one pair of half bodies 1a. And, number of parts is reduced and the construction is simplified because the elastic member is composed only of the first spring 11 and the second spring 12, and the device can be made compact thereby.

And, the first spring 11 and the second spring 12 are easily assembled to be stronger with connection of the half bodies 1a. And, the construction can be made simple.

And, number of the elastic members G is reduced, and the construction can be simplified further.

While preferred embodiments of the present invention have been described in this specification, it is to be understood that the invention is illustrative and not restrictive, because various changes are possible within the spirit and indispensable features.

What is claimed is:

1. A clamp device for a disc comprising
   a pair of friction plate units pressed to both sides of the disc by a pair of fluid pressure pistons enclosed in the body to stop rotation of the disc,
   a pair of half bodies connected and unified with a fixation member,
   a first spring which elastically pushes one of the friction plate units in a parting direction from the disc and in a rotation direction of the disc simultaneously, and
   a second spring which elastically pushes the other of the friction plate units in a parting direction from the disc and in an opposite direction to the rotation direction of the disc simultaneously;
   wherein the first spring and the second spring are substantially identical in configuration;
   and wherein the configuration of the first spring and the second spring is asymmetrical.

2. The clamp device as set forth in claim 1, wherein
   the first spring and the second spring are each held by a respective concave groove formed on each of mating faces of the half bodies,
   upper sides of the first spring and the second spring are U-shaped and are inserted into the concave grooves,
   the pair of half bodies are connected and unified with the fixation member, and
   left and right leg portions of the first spring are hitched to one of the friction plate units and left and right leg portions of the second spring are hitched to the other of the friction plate units.

3. A clamp device for a disc comprising a pair of half bodies connected and unified with a fixation member,
   a pair of friction plate units pressed to both sides of the disc by a pair of fluid pressure pistons enclosed in the body to stop rotation of the disc,
   an elastic member comprising a first spring and a second spring, each one of the first and the second spring elastically pushes the pair of friction plate units in directions parting each other and in directions along and opposite to a rotation of the disc simultaneously;
   wherein each one of the first spring and the second spring in a free state is asymmetrical a plane lying within the disc.

4. The clamp device as set forth in claim 3, wherein
the elastic member comprises a U-shaped first spring and a U-shaped second spring,
one pair of concave grooves is formed on faces corresponding to a periphery of the disc in a concave portion formed in the body to which the periphery of the disc is inserted,
upper sides of the first spring and the second spring are inserted into the concave grooves,
left and right leg portions of the first spring are hitched to the pair of the friction plate units, and
left and right leg portions of the second spring are hitched to the pair of the friction plate units.

* * * * *